(No Model.)
F. A. BROWNELL.
PHOTOGRAPHIC SHUTTER.
No. 501,866. Patented July 18, 1893.
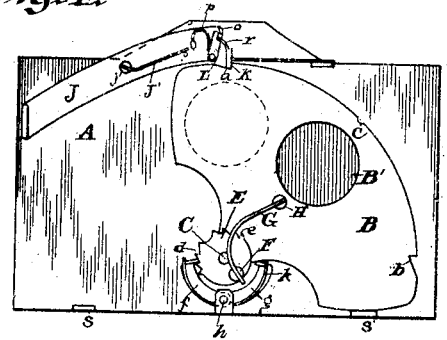
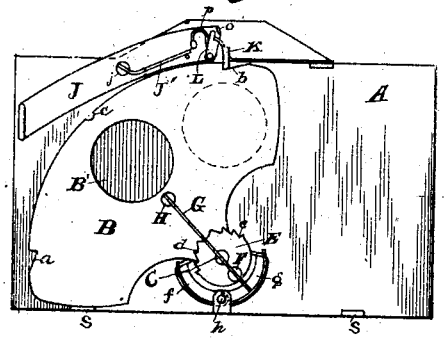
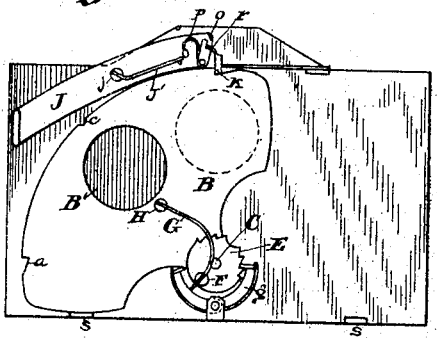
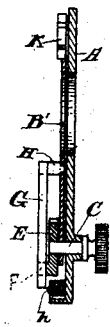
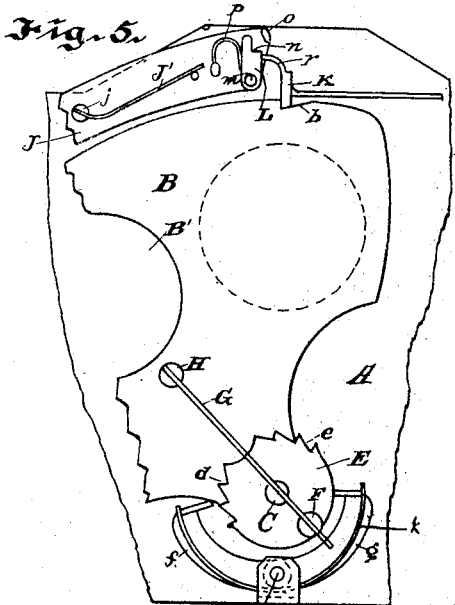
Witnesses
Fred G. Church
Thomas Durant
Inventor
Frank A. Brownell
By his Attorneys
Church & Church

UNITED STATES PATENT OFFICE.

FRANK A. BROWNELL, OF ROCHESTER, NEW YORK, ASSIGNOR, BY MESNE ASSIGNMENTS, TO THE EASTMAN KODAK COMPANY, OF SAME PLACE.

PHOTOGRAPHIC SHUTTER.

SPECIFICATION forming part of Letters Patent No. 501,866, dated July 18, 1893.

Application filed October 24, 1889. Serial No. 328,021. (No model.)

*To all whom it may concern:*

Be it known that I, FRANK A. BROWNELL, of the city of Rochester, county of Monroe, and State of New York, have invented certain new and useful Improvements in Photographic Shutters; and I do hereby declare the following to be a full, clear, and exact description of the same, reference being had to the accompanying drawings, forming a part of this specification, and to letters of reference marked thereon.

My present invention relates to photographic shutters adapted particularly for use in cameras employing film, or in detective cameras, where it is undesirable to employ shutters that necessitate the movement of the shutter aperture in line with the lens opening, a second time, when setting the shutter, as this second passage would either cause a second exposure of the sensitized material or else would necessitate the employment of an auxiliary shutter or opaque septum between it and the opening.

My invention therefore, has for its object to provide a shutter possessing this desirable feature, and also one simple and cheap in construction and positive in its operation and to these ends consists in certain novel constructions and combinations of parts all as will be hereinafter described and pointed out particularly in the claims at the end of the specification.

In the drawings: Figure 1 is a view of a shutter with its motor spring set for an exposure in one direction; Fig. 2 a similar view after the exposure; Fig. 3, a similar view with the shutter set for an operation in the other direction; Fig. 4, a vertical sectional view, and Fig. 5 a view showing the operation of the releasing latch.

Similar letters of reference in the several figures denote similar parts.

The letter A represents a support for the shutter which may consist of a separate plate, a camera front or a lens support, and upon this support is arranged the shutter B, consisting in the present instance of a segmental plate loosely pivoted upon a pin or arbor C, journaled in the support. The shutter is provided near the center with an exposing aperture B' arranged, when oscillated, to coincide with the lens opening and admit the rays passing through the lens, and preferably upon its periphery are provided notches $a$, $b$, $c$, the two former near the ends of its outer edge, and the latter near the center thereof, as shown. A spring catch K is secured to the plate A, and has upon its end a plate or shoulder arranged to engage the notches in the shutter edge, being pressed normally against the latter. The spaces between the edges of the shutter and the exposing aperture are sufficient to cover the lens opening, no matter on which side of the latter the shutter may be oscillated, and it will be noted that the straight sides of notches $a$ and $b$ are toward the center of the shutter, so that the catch for engaging the shutter, will hold the latter from moving in a direction to cause the exposing aperture to move across the lens opening, no matter in which direction the motor tends to move it. As a simple and convenient form of motor for moving this shutter from opposite sides alternately, (though by no means the only one,) I provide the arbor or shaft C (in the present instance, the one on which the shutter is pivoted) with a wheel or disk E having a pin or projection F thereon arranged eccentric to the arbor, and extend from this pin a spring G connected at the other end to a pin H, on the shutter, the connection between the two pins and springs being formed, preferably, by slitting the ends of the former and inserting the end of the spring in the slit, and clamping it therein by pressing the ends of the pins together. The disk E is provided on its periphery with two series of reversed ratchet teeth $d$ and $e$, arranged on opposite sides of the pin F, with which co-operate pawls $f$ and $g$ respectively,—said pawls being pivoted upon a common pivot pin $h$ and pressed into contact with wheel E by a spring $k$ the opposite ends of which engage the pawls. It will now be seen that by turning the arbor C in one direction, say to the left, the operator can bend the spring G as in Fig. 1, the shutter being of course held by a catch and the pawls $f$ engaging one or the other of the teeth of ratchet $d$, and, upon the release of the catch, the spring will move the shutter across to the position in Fig. 2, the exposing aperture crossing the lens opening and causing the exposure. As soon as the shutter reaches the position in Fig. 2 its lower edge engages the pawl $f$ and disengages the latter from the ratchet, the shutter however, being arrested by the catch K and prevented from accidental movement. To cause another exposure the operator turns the arbor C in the other direction, to the right, as in Fig. 3, engaging ratchet teeth $e$ with pawl $g$, thereby setting the shutter for operation in the other direction, so that upon the release of the catch again the spring will move the shutter over to first position and so on, the exposures being caused by the oscillation of the shutter in opposite directions. The speed of the shutter can be adjusted by turning the arbor a greater or less distance so as to engage the second or third ratchet tooth, increasing the tension under which the spring is placed.

While the catch K for holding and releasing the shutter may be operated by any suitable means, as a push button or ordinary lever, I prefer to employ the device shown in the drawings, which catch-operating device could as well be employed on other shutters. In this shutter, particularly, it is desirable that the catch be moved only sufficient to cause the release of the shutter and then be returned to normal position, so as to engage the shutter after its excursion is made and prevent its flying back again, as might be caused by continued pressure on the releasing button. To prevent this I prefer to employ a movable plate, in this instance in the form of a lever J pivoted at $j$ on the plate A, and arrange upon its inner end a latch L, pivoted at $m$, provided with a shoulder $n$, and pressed outward against a stop $o$ by means of a small spring $p$. In its normal position this lever J is pressed downward by a spring J' connected to it and its pivotal pin, with the shoulder $n$ of the latch under the projection $r$ on the end of catch K, as in Figs. 1, 2, and 3, but upon pressure on the outer end of the lever the latch will raise the shutter-catch until shoulder $n$ passes from beneath it by reason of its movement around the center $j$, when the catch will drop back on the periphery of the shutter to engage the notch $a$ or $b$, as the case may be.

The shutter may be arrested on opposite sides by the stops $s\ s$ or any other suitable devices desired.

In order to permit a time exposure to be made, the operator lifts the catch K from engagement with one or the other of the notches $a$ or $b$, and turns the shutter by hand, through the arbor and spring, until the catch engages the central notch $c$, when the exposing aperture will be in line with the lens opening and the exposure may be made by uncapping the lens in the ordinary manner. To adapt the shutter again for instantaneous work the arbor is moved to either one side or the other as desired.

The location of the shutter is immaterial, as it may be between the lenses or on either side of them, or, if desired, two co-operating apertured shutters may be employed connected so as to oscillate in opposite directions simultaneously, their apertures coinciding with the lens opening; in any event the motor, whether it be a spring or any other form, should be capable of operating the shutters in opposite directions, alternately.

It will be noted that the arbor to which one end of the motor spring is connected is on the vibratory center of the shutter, and the shutter aperture is moved back and forth across a certain point (in the present instance the lens opening).

Instead of the pivoted shutter shown a sliding shutter could be employed as well, the term "vibratory" being employed to mean a shutter moving across the lens opening.

I claim as my invention—

1. The combination with the vibrating shutter, of the arbor, the reversed ratchets thereon, the spring connecting the shutter and arbor, and the pawls co-operating with the ratchets, substantially as described.

2. The combination with the vibrating shutter having the two notches and the spring catch co-operating therewith, of the arbor, the reversed ratchets thereon, the spring connecting the shutter and arbor, and the pawls for engaging the ratchets, substantially as described.

3. The combination with the vibrating shutter arranged to open and close a lens opening by a single movement in either direction, of a spring connected at one end to the shutter, a support to which the other end of the spring is connected capable of being moved across the center of vibration, and catches for holding said support arranged to be disengaged by the movement of the shutter, substantially as described.

4. The combination with the vibrating shutter, of an arbor on which it is loosely pivoted, a spring connected to the arbor and shutter, detents for engaging the arbor, and a catch for engaging the shutter, substantially as described.

5. The combination with a photographic shutter and a catch for engaging it, of a movable plate carrying a latch for operating said catch in one direction, substantially as described.

6. The combination with a photographic shutter and a spring catch for engaging it, of a pivoted lever, a latch thereon adapted to engage and release the catch by its continued movement, substantially as described.

FRANK A. BROWNELL.

Witnesses:
 FRED F. CHURCH,
 S. E. TRUE.